United States Patent
Karande et al.

(10) Patent No.: US 8,914,892 B2
(45) Date of Patent: Dec. 16, 2014

(54) METHOD AND SYSTEM TO ENHANCE ACCURACY OF A DATA LEAK PREVENTION (DLP) SYSTEM

(75) Inventors: Advait Deepak Karande, Singapore (SG); Mohit Chugh, San Francisco, CA (US); Nandagopal Seshagiri, Singapore (SG)

(73) Assignee: International Business Machines Corporation, Armonk, NY (US)

( * ) Notice: Subject to any disclaimer, the term of this patent is extended or adjusted under 35 U.S.C. 154(b) by 422 days.

(21) Appl. No.: 13/026,497

(22) Filed: Feb. 14, 2011

(65) Prior Publication Data
US 2012/0210437 A1    Aug. 16, 2012

(51) Int. Cl.
G06F 21/00    (2013.01)
G06F 21/54    (2013.01)

(52) U.S. Cl.
CPC ..................................... *G06F 21/54* (2013.01)
USPC ........................................... 726/26; 713/193

(58) Field of Classification Search
CPC ...................................................... G06F 21/54
USPC ............................................................ 726/26
See application file for complete search history.

(56) References Cited

U.S. PATENT DOCUMENTS

| 7,788,235 B1 | 8/2010 | Yeo |
| 2007/0118558 A1* | 5/2007 | Kahandaliyanage ...... 707/104.1 |
| 2007/0162749 A1* | 7/2007 | Lim .............................. 713/167 |
| 2010/0036779 A1 | 2/2010 | Sadeh-Koniecpol et al. |
| 2010/0146269 A1 | 6/2010 | Baskaran |
| 2010/0161830 A1 | 6/2010 | Noy et al. |
| 2010/0162347 A1 | 6/2010 | Barile |
| 2010/0268934 A1 | 10/2010 | Hinton et al. |
| 2010/0306850 A1 | 12/2010 | Barile et al. |

* cited by examiner

*Primary Examiner* — Justin T Darrow
(74) *Attorney, Agent, or Firm* — Jeffrey S. LaBaw; David H. Judson

(57) ABSTRACT

A Data Loss Prevention (DLP) system is enhanced according to this disclosure by augmenting the information obtained from OS API hooking with "context" information obtained from other sources, such as by monitoring an endpoint's user interface (UI). In one embodiment, the additional "context" information is obtained from one or more user interface hooks that provide the DLP system with additional information, such as the contents of one or more application windows, the UI elements contained in a particular display window, window activation or deactivation, window resizing, user input, pointer operations, and the like. This UI information defines a "context" of the application, namely, its operating state (including, without limitation, its display state), and associated user actions that define that state. When a particular OS API hook is invoked by the application, the DLP solution uses the context information to make a more accurate enforcement decision, preferably based on the UI context.

24 Claims, 3 Drawing Sheets

METHOD AND SYSTEM TO ENHANCE ACCURACY OF A DATA LEAK PREVENTION (DLP) SYSTEM

BACKGROUND OF THE INVENTION

1. Technical Field

This disclosure relates generally to identifying and managing user operations with respect to sensitive information (e.g., intellectual property, personally identifiable information, and the like).

2. Background of the Related Art

Data leakage from the secured intranet of an enterprise takes place through a variety of means, such as email, instant messaging, file transfers, document printing, removable USB devices, and the like. Data Loss Prevention (DLP) systems have been developed to address this problem. A DLP system operates generally to identify, monitor use of, and to control user operations on, sensitive information within an enterprise computing environment. DLP systems are designed to prevent data flow from inside the network to the outside world. This data flow may be unintentional or intentional. Unlike event-based notification systems, DLP provides a policy-based approach for managing how data is discovered and classified on a user's workstation or file server, also known as an "endpoint." In such systems, data of interest (sometimes referred to as an "artifact," an "item" or an "object") is classified into various well-defined "content categories," such as "company confidential" or "personally identifiable information (PII)." DLP technologies address the problem of data loss by enforcing policy on artifacts and, in particular, by preventing or auditing actions (such as copying a file to external storage) on artifacts based on content category. Some DLP systems approach the problem by monitoring the network for any sensitive information that may be intended for transmission or otherwise received over the Internet. While network-based approaches are useful, often the most effective way of preventing data loss is monitoring the endpoints of the enterprise's IT infrastructure.

The typical approach used by endpoint DLP solutions involves hooking of operating system (OS) application programming interfaces (APIs) that access or manipulate data. A solution of this type works by installing hooks for OS APIs that perform such tasks such as opening, copying or printing files, performing screen capture, or that send data over the network. While this approach of hooking low-level system calls ensures that most if not all possible ways of data leakage can be monitored, it may have poor accuracy with respect to DLP policy enforcement. Primarily, this is because a single instance of most enterprise applications is capable of opening and manipulating multiple files, and the sensitivity of the context of each file may be different. For example, a single instance of WinWord.exe, the Microsoft® Office™ executable, may open multiple files for editing at the same time. When the user attempts to print one of the files, the API hooks for printing do not receive the information on which file is being printed. Ideally, the operation should be blocked only if the user actually attempts to print a sensitive file, i.e. one that is not allowed to be printed by the applicable DLP policy.

The only existing mechanism for avoiding the problem described above is to understand the behavior of every single application, and then to develop application-specific components or plug-ins that monitor the application behavior. But this approach requires that the application include a plug-in framework, which is costly and creates undesirable processing overhead.

There remains a need to enhance the accuracy of data leak prevention (DLP) systems.

BRIEF SUMMARY OF THE INVENTION

A Data Loss Prevention (DLP) system is enhanced according to this disclosure by augmenting the information obtained from OS API hooking with "context" information obtained from other sources, such as by monitoring an endpoint's user interface (UI). In one embodiment, the additional "context" information is obtained from one or more user interface hooks that provide the DLP system with additional information, such as the contents of one or more application windows, the UI elements contained in a particular display window, window activation or deactivation, window resizing, user input, pointer operations, and the like. This UI information defines a "context" of the application, namely, its operating state (including, without limitation, its display state), and associated user actions that define that state. When a particular OS API hook is invoked by the application, the DLP solution uses the context information to make a more accurate enforcement decision, preferably based on the UI context.

In one embodiment, a data loss prevention method in an endpoint begins by defining at least one OS API hook. During operation of an application, context information is captured. Upon invocation of the at least one OS API hook, the context information is then used to determine whether a DLP enforcement action should be invoked.

In an alternative embodiment, the above-described method is performed in a DLP apparatus. The apparatus comprises a processor, and computer memory that holds computer program instructions executed by the processor to carry out the method.

In another alternative embodiment, the above-described method is performed by a computer program product in a computer readable medium for use in a DLP system. The computer program product holds computer program instructions which, when executed by the data processing system, perform the method.

The foregoing has outlined some of the more pertinent features of the invention. These features should be construed to be merely illustrative. Many other beneficial results can be attained by applying the disclosed invention in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
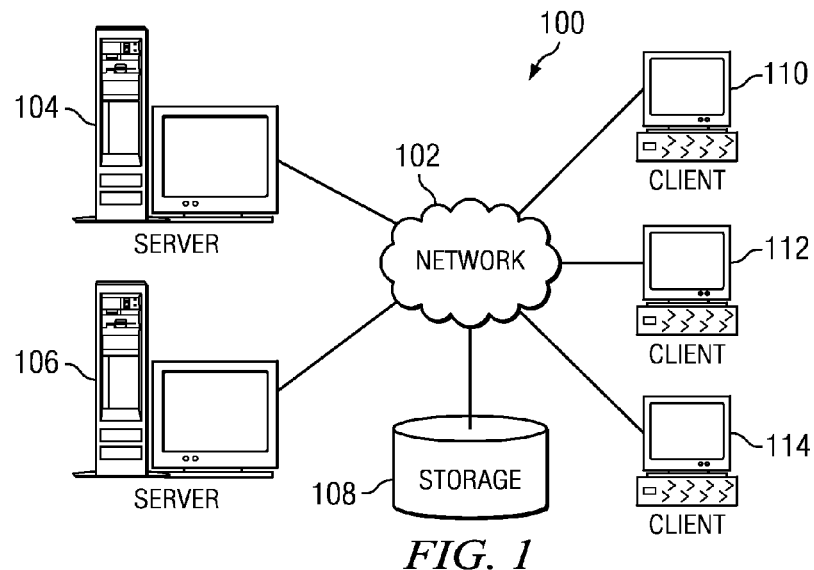
FIG. 1 depicts an exemplary block diagram of a distributed data processing environment in which exemplary aspects of the illustrative embodiments may be implemented.
Figure 2:
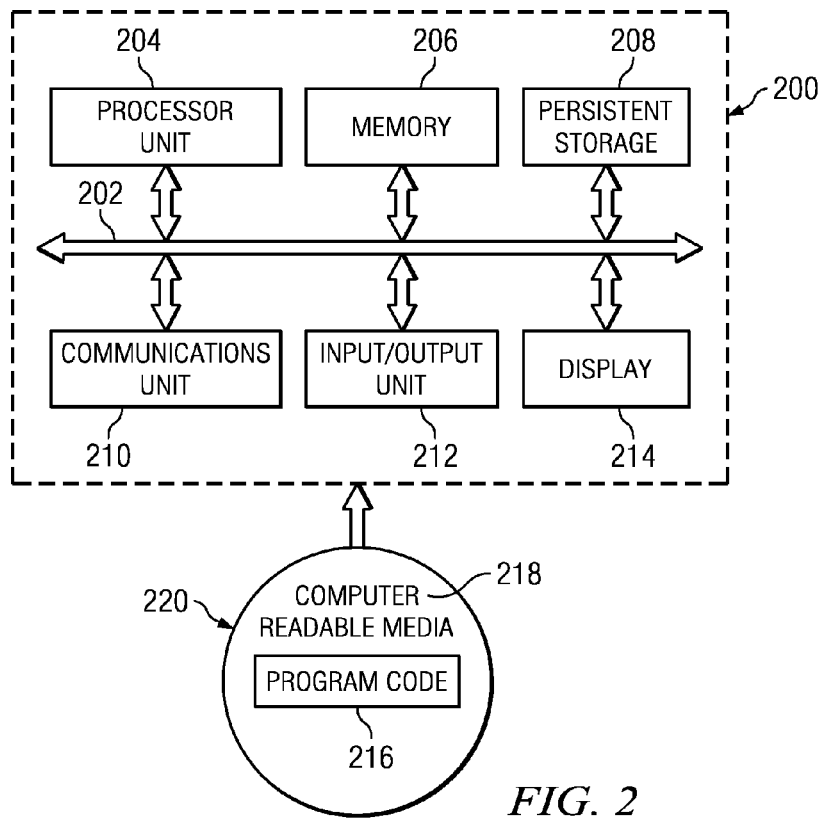
FIG. 2 is an exemplary block diagram of a data processing system in which exemplary aspects of the illustrative embodiments may be implemented.

With reference now to the drawings and in particular with reference to FIGS. 1-2, exemplary diagrams of data processing environments are provided in which illustrative embodiments of the disclosure may be implemented. It should be appreciated that FIGS. 1-2 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to the drawings, FIG. 1 depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 2, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the illustrative embodiments may be applied to a multiprocessor data processing system, other than the SMP system mentioned previously, without departing from the spirit and scope of the disclosed subject matter.

As will be seen, the techniques described herein may operate in conjunction within the standard client-server paradigm such as illustrated in FIG. 1 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 2 comprising hardware and software, and these entities communicate with one another over a network, such as the Internet, an intranet, an extranet, a private network, or any other communications medium or link. A data processing system typically includes one or more processors, an operating system, one or more applications, and one or more utilities. The applications on the data processing system provide native support for Web services including, without limitation, support for HTTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP and XML is available from Internet Engineering Task Force (IETF). Familiarity with these standards is presumed.

Figure 3:
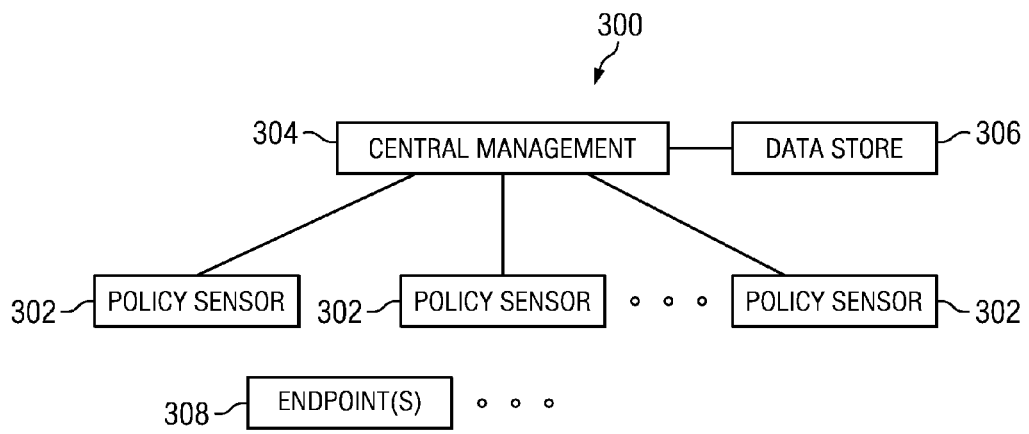
FIG. 3 illustrates a data loss prevention (DLP) solution in which the subject matter of this disclosure may be implemented.

Although not meant to be limiting, a representative data processing system in which the techniques of this disclosure are implemented is an appliance-based data loss prevention (DLP) solution. DLP systems are well-known and work to reduce the risk of sensitive data loss, primarily at the network layer. As seen in FIG. 3, a representative network-based DLP solution 300 comprises a set of distributed components, typically arranged in a tiered architecture. Multiple policy sensors 302 are placed around the network (typically as rack-based appliances, software applications, or the like) and are designed to detect and/or prevent data loss. Generally, in an appliance-based implementation, an appliance may comprise a data processing system such as described in FIG. 2. The appliance includes a policy engine that works generally by capturing packets from the network, reassembling the packets into sessions, analyzing the information flow, extracting content for analysis, and performing content analysis to identify sensitive information. The appliance may use system-defined or user-defined policies, where a policy represents a group of one or more rules. A rule typically is a logical combination of one or more triggers that are content-based, location-based and/or flow-based. Sessions with policy violations are detected by the sensors and forwarded a central management console 304 that distributes policies and collects and organizes alerts. A data store 306 is used to store data and policies, typically in a database. The central management console 304 includes a web-based graphical user interface (GUI) for management, administration and reporting. As used herein, the type of sensitive information protected by such a DLP solution may be quite varied. Typically, such information includes, without limitation, intellectual property (e.g., code, designs, documentation, other proprietary information), identity information (e.g., personally identifiable information (PII)), credit card information (such as PCI-related data), health care information (such as HIPAA-related data), finance information (such as GLBA-related data), and the like. As also seen in FIG. 3, the DLP solution is implemented across one or more endpoints 308.

Preferably, a policy is created and managed in the central management console (such as shown in FIG. 3).

While the system shown in FIG. 3 is a network-based DLP system, endpoint-based DLP systems also are known. In an endpoint-based DLP system, policy sensors are installed on endpoints and operate to monitor/block usage of sensitive data by the running applications (rather than capturing network packets).

DLP functionality may also be built into other enterprise systems, such as an intrusion detection system (IDS), an intrusion protection system (IPS), network firewalls, web gateways, mail servers or relays, enterprise content management systems, or the like. Thus, for example, an IPS can monitor and detect attack traffic, and DLP support can be added to perform outbound DLP protection and associated blocking of the transfer of sensitive content.

Thus, in general a DLP system in which the subject matter herein is implemented provides a policy-based mechanism for managing how data is discovered and classified on an endpoint workstation, file server or other device within an enterprise. Typically, the techniques described herein are implemented in an endpoint-based DLP system, although this is not a limitation, as the techniques may be implemented in, or in association with, other DLP functionality. As used herein, in general an endpoint is a data processing system (such as described above in FIG. 2) and that has an associated file system (or equivalent data store). The endpoint may execute DLP software. As noted, a representative endpoint is a data processing system that includes a DLP application that executes as software, i.e., as a set of program instructions, executed from computer memory by a processor. The DLP application is configurable according to a policy, where the policy is created and managed in a central management console (such as shown in FIG. 3). This is not a limitation, however, as a particular DLP policy may be implemented locally (at the endpoint itself).

Figure 4:
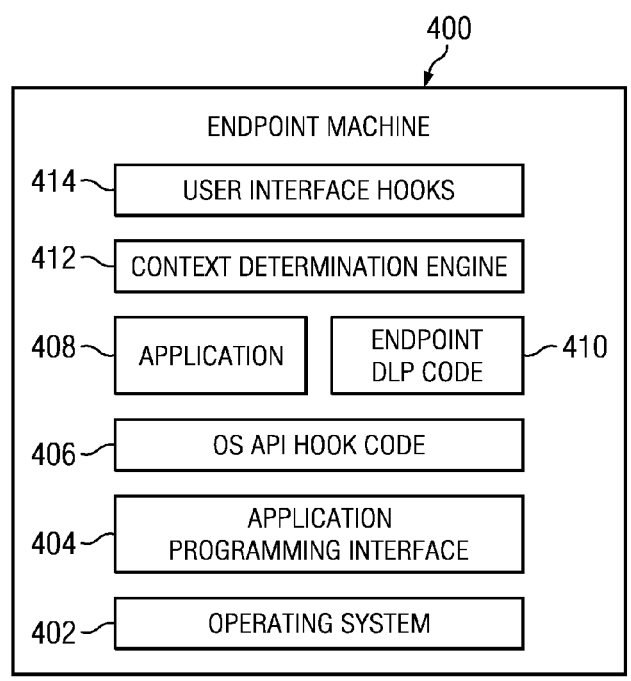
FIG. 4 illustrates a DLP endpoint that includes the functionality that is the subject of this disclosure.

A technique for enhancing the accuracy of a DLP system is now described. The functionality described may be integral (or native) to the DLP system, or it may be provided as an adjunct system or sub-system. Preferably, and as will described, the functionality is built into a DLP endpoint solution and, in particular, an DLP endpoint that has been instrumented with an operating system (OS) application programming interface (API). FIG. 4 illustrates a preferred implementation. In this embodiment, endpoint machine 400 is a data processing system such as shown in FIG. 2. It includes an operating system (OS) 402 and an application programming interface (API) 404 that has been extended with hook code 406, all in a known manner. An application 408 executes on the endpoint machine. The application is of any type, such as a word processing application (a representative example being Microsoft WinWord.exe). Endpoint machine also executes DLP endpoint code 410, such as shown in FIG. 3. The endpoint code 410 is configured to install and execute the hook code 406. In a known manner, the hook code 406 instruments the DLP endpoint such that, upon invocation of one or more OS APIs associated with the hook code, the hook code 406 provides an indication of an event of interest. Although the nature of the events varies with the application being instrumented, representative OS API events include, without limitation, the opening, copying or printing of a file, the capturing of a display screen, the sending of data over a network, and many more. The particular OS API event will depend on the particular application instrumented.

According to this disclosure, the DLP solution also includes a context determination engine 412. As will be described, the context determination engine receives "context information" preferably from one or more user interface (UI) hooks 414 that are installed by the DLP code. As will be seen, this context information is combined (or, more generally, associated) with the information provided by the application hook code 406 to provide a much more fine-grained determination regarding whether a DLP policy is or should be triggered.

The technique is now described by way of an example using Microsoft WinWord.exe as the application, and a common file printing scenario. When the application 408 starts, the API hooks 406 installed by the DLP code 410 start monitoring any display windows created by the application. As the end user opens one or more documents for editing, the DLP code 410 keeps a list of all opened files based on the information obtained from the API hooks. As the document opens in a display window, the document file name appears in a display window title frame, as is well-known. By capturing such information (by way of example only), the UI hooks 414 associate the document with the display window (identified by the API hooks 406) which displays it. Preferably, the DLP code continues to monitor a top-most, active display window, i.e., the display window with a current "focus," as the end user opens other documents and/or switches among the open files. When the end user proceeds to print one of the documents from the application, the DLP code associates the file print API invocation with a specific document (e.g., the document with the display window focus). Depending on the sensitivity of the document and the applicable enforcement policy, the DLP solution then takes the appropriate action (as defined by the policy). The action may be to block the printing, to allow the printing, and so forth.

Figure 5:
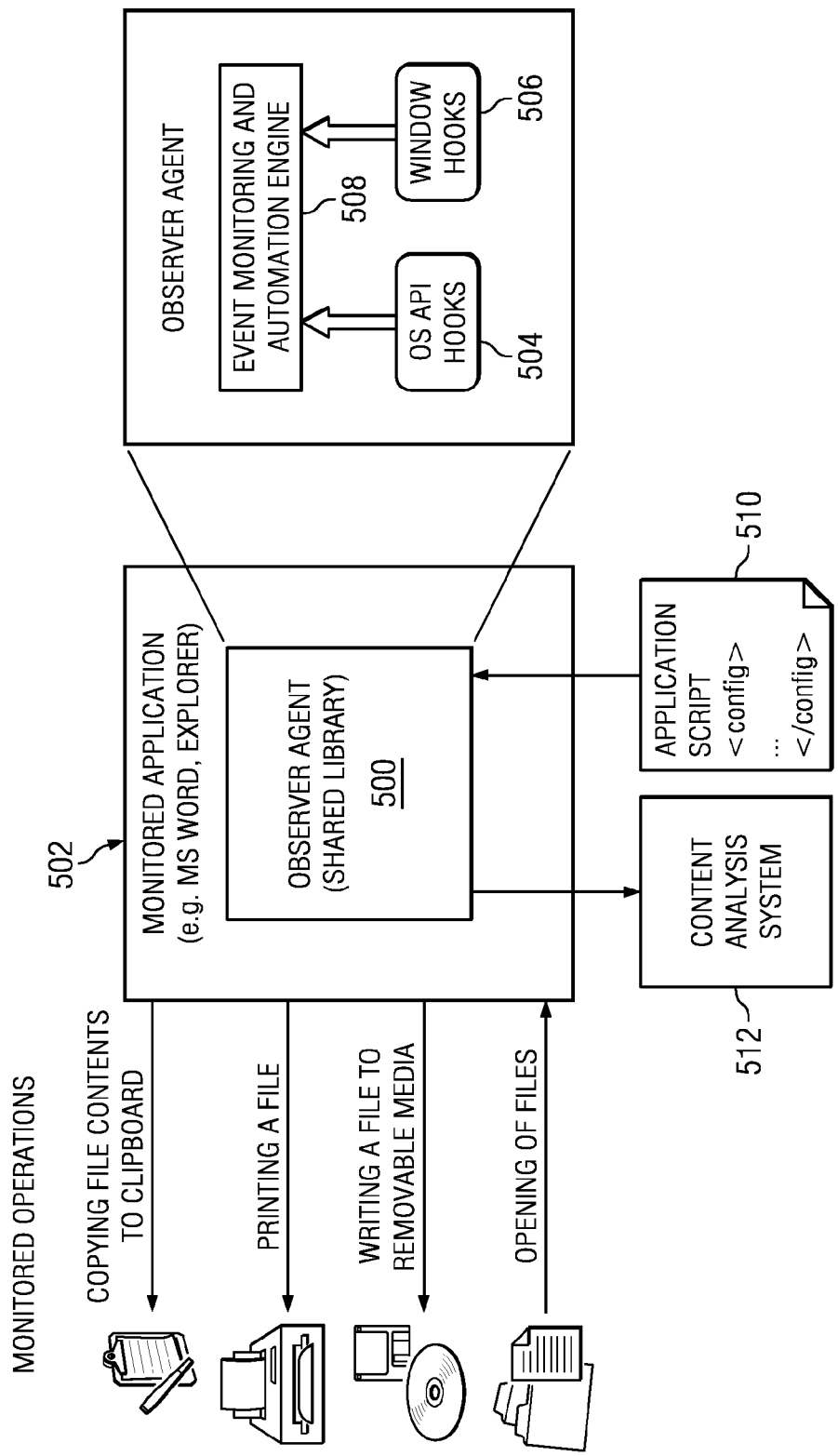
FIG. 5 illustrates a shared library agent that implements the disclosed functionality.

As shown in FIG. 5, which is a representative implementation, the logic for monitoring both OS API calls and window events, and that of performing DLP enforcement, is encapsulated in a shared library agent 500 that is associated with the monitored application 502. The library 500 is adapted to be implemented as computer software (a set of program instructions) executed by one or more processors. Preferably, the shared library agent (sometimes referred to as an "observer agent" for convenience) comprises first hook code 504 to implement the OS API hooks, and second hook code 506 to implement the contextual (e.g., UI display window) hooks. The library agent 500 also comprises an event monitoring and automation engine 508, which is driven by the events generated by the OS API hooks 504 and the UI hooks 506. The engine 508 obtains any application-specific information that is required for performing DLP enforcement from a configuration file 510. The configuration file 510 typically includes information such as a process name, regular expressions for the display window titles, and the like. In operation, the observer agent queries a content analysis system 512, which may be a component of the DLP solution, to determine whether a particular file operation should be allowed based on the classification of the file content.

Preferably, the observer agent 500 is loaded into every process, e.g., using standard techniques available for shared library injection. Once loaded in a process, the agent installs the OS API hooks. As illustrated, these hooks monitor the operations (such as opening of files, printing/copying of files, copying files to a clipboard, writing a file to a removable disk, etc.). The event monitoring and automation engine combines the information from the OS API hooks with that obtained from the display window hooks (which are hooks provided by the Microsoft Windows operating system in this example), and then uses the configuration file and the content analysis system to perform the DLP enforcement.

The subject matter described herein has many advantages. By augmenting the OS API hooks with application-specific context information (such as UI events), the DLP solution provides a much more fine-grained way to trap operations that could lead to data loss. By combining the information from two types of hooks, more sophisticated heuristics (as implemented, for example, by a content analysis system) may be used, thereby allowing more accurate and useful DLP enforcement decisions. Further, by using a UI monitoring and automation system in conjunction with OS level API hooks is that the UI automation system allows dismissing of any application error UI that might arise in response to blocking the API. This allows the DLP system to provide a consistent user interface across applications whenever it intercepts a potential data leakage workflow.

The functionality described above may be implemented as a standalone approach, e.g., a software-based function executed by a processor, or it may be available as a managed service (including as a web service via a SOAP/XML interface). The particular hardware and software implementation details described herein are merely for illustrative purposes are not meant to limit the scope of the described subject matter.

More generally, computing devices within the context of the disclosed invention are each a data processing system (such as shown in FIG. 2) comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF). Familiarity with these known standards and protocols is presumed.

The scheme described herein may be implemented in or in conjunction with various server-side architectures including simple n-tier architectures, web portals, federated systems, and the like. The techniques herein may be practiced in a loosely-coupled server (including a "cloud"-based) environment.

Still more generally, the subject matter described herein can take the form of an entirely hardware embodiment, an entirely software embodiment or an embodiment containing both hardware and software elements. In a preferred embodiment, the function is implemented in software, which includes but is not limited to firmware, resident software, microcode, and the like. Furthermore, as noted above, the DLP information classification change detection functionality described herein can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk—read only memory (CD-ROM), compact disk—read/write (CD-R/W) and DVD. The computer-readable medium is a tangible item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the artifact state machine described above is implemented in a special purpose computer, preferably in software executed by one or more processors. The software is maintained in one or more data stores or memories associated with the one or more processors, and the software may be implemented as one or more computer programs. Collectively, this special-purpose hardware and software comprises or supplements an existing DLP solution.

The DLP central management console exposes one or more web-based interfaces that may be used to create and/or modify a policy, and/or to determine policies applicable to a particular endpoint. The content analysis system typically is a component of the DLP system, although it may be a standalone component or delivered as part of the solution described herein.

As noted, the described functionality may be implemented as an adjunct or extension to an existing DLP solution including, without limitation, an DLP client endpoint, a DLP server, or the like.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The techniques disclosed herein are not limited to a middleware DLP appliance that monitors network traffic such as has been described, but this will be a typical implementation. The above-described information classification change detection function may be used in any system, device, portal, site, or the like wherein it is desired to analyze data for inclusion of sensitive information.

The term "artifact" should be broadly construed to refer to an item or object of interest (including its content) to a DLP system, policy, component, program or process.

Having described our invention, what we now claim is as follows.

The invention claimed is:

1. A method for data loss prevention (DLP) in an endpoint machine having an operating system that has been instrumented with at least one application programming interface (API) hook to provide first information about an event upon invocation of the API hook, comprising:
  receiving context information generated as an end user interacts with an application executing on the endpoint machine, the context information being distinct from the first information; and
  upon invocation of the API hook, using the received context information together with the first information to determine whether an action associated with the application involves sensitive data.

2. The method as described in claim 1 wherein the context information defines an operating state of the application.

3. The method as described in claim 1 wherein the context information is derived from an end user interaction with an interface associated with the endpoint machine.

4. The method as described in claim 3 wherein the interface is a graphical user interface (GUI) and the received context information is a display window event that indicates that a given display window of a set of windows has a focus on the graphical user interface.

5. The method as described in claim 1 further including taking a data loss prevention action if the action associated with the application involves sensitive data.

6. The method as described in claim 5 wherein the data loss prevention action is defined in a policy.

7. The method as described in claim 1 wherein the context information is analyzed against data obtained upon invocation of the hook.

8. Apparatus, comprising:
a processor;
computer memory holding computer program instructions that when executed by the processor perform a method comprising:
instrumenting an operating system with at least one application programming interface (API) hook, the API hook adapted to provide first information about an event upon invocation of the API hook;
receiving context information generated as an end user interacts with an application, the context information being distinct from the first information; and
upon invocation of the API hook, using the received context information together with the first information to determine whether an action associated with the application involves sensitive data.

9. The apparatus as described in claim 8 wherein the context information defines an operating state of the application.

10. The apparatus as described in claim 8 wherein the context information is derived from an end user interaction with an interface associated with the apparatus.

11. The apparatus as described in claim 10 wherein the interface is a graphical user interface (GUI) and the received context information is a display window event.

12. The apparatus as described in claim 8 wherein the method further includes taking a data loss prevention action if the action associated with the application involves sensitive data.

13. The apparatus as described in claim 12 wherein the data loss prevention action is defined in a policy.

14. The apparatus as described in claim 8 wherein the context information is analyzed against data obtained upon invocation of the hook.

15. A computer program product in a non-transitory computer readable medium, the computer program product holding computer program instructions which, when executed by a data processing system, perform a method comprising:
instrumenting an operating system with at least one application programming interface (API) hook, the API hook adapted to provide first information about an event upon invocation of the API hook;
receiving context information generated as an end user interacts with an application, the context information being distinct from the first information; and
upon invocation of the API hook, using the received context information together with the first information to determine whether an action associated with the application involves sensitive data.

16. The computer program product as described in claim 15 wherein the context information defines an operating state of the application.

17. The computer program product as described in claim 15 wherein the context information is derived from an end user interaction with an interface associated with the data processing system.

18. The computer program product as described in claim 17 wherein the interface is a graphical user interface (GUI) and the received context information is a display window event.

19. The computer program product as described in claim 15 wherein the method further includes taking a data loss prevention action if the action associated with the application involves sensitive data.

20. The computer program product as described in claim 19 wherein the data loss prevention action is defined in a policy.

21. The computer program product as described in claim 15 wherein the context information is analyzed against data obtained upon invocation of the hook.

22. The computer program product as described in claim 15, wherein the computer program instructions are stored in a computer readable storage medium in the data processing system, and wherein the computer program instructions were downloaded over a network from a remote data processing system.

23. The computer program product as described in claim 15, wherein the computer program instructions are stored in a computer readable storage medium in a server data processing system, and wherein the computer program instructions are downloaded over a network to a remote data processing system for use in a computer readable storage medium with the remote system.

24. The computer program product as described in claim 15, wherein the computer program instructions are provided by a service provider to a customer on an on-demand basis.

* * * * *